Feb. 7, 1939. M. H. REITINGER 2,146,129
WINDING GUIDE
Filed July 20, 1937
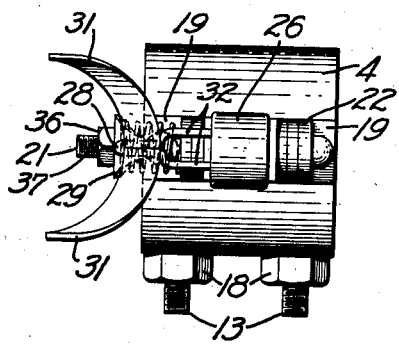
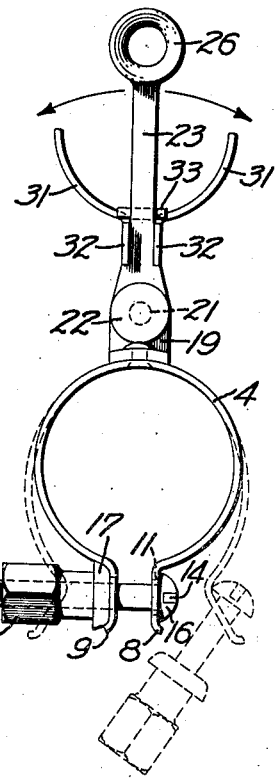
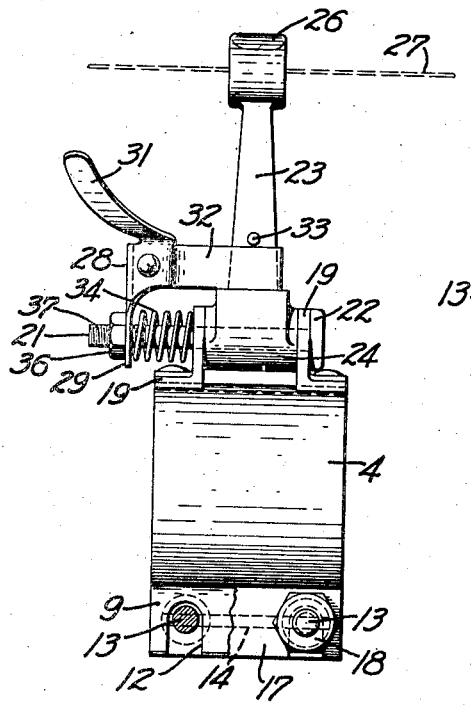
INVENTOR
Max H. Reitinger
BY
Harry Schroedt
ATTORNEY Patented Feb. 7, 1939

2,146,129

UNITED STATES PATENT OFFICE 2,146,129

WINDING GUIDE

Max H. Reitinger, Oakland, Calif.

Application July 20, 1937, Serial No. 154,588

3 Claims. (Cl. 242—84.4)

This invention relates to means for guiding cord or the like on to a rotating spool or mandrel upon which the cord is to be wound.

An object of the invention is to provide a manually operated line guide for use particularly with fishing reels.

Another object of the invention is to provide a winding guide which may be detachably mounted on a fishing rod and which may be adjustably positioned relative to the reel.

A further object of the invention is to provide a device of the character described which may be produced very economically.

The invention possesses other objects and features of advantage, some of which, together with the foregoing, will be specifically set forth in the detailed description of the invention which follows. It is to be understood that the invention is not to be limited to the specific form thereof shown and described as various other embodiments thereof may be employed within the scope of the appended claims.

Referring to the drawing:

Figure 1 is a top plan view of the winding guide of my invention; and

Figures 2 and 3 are, respectively, side elevational and end elevational views thereof.

One of the principal faults that anglers find with the familiar type of level winding reel is the resistance set up by the gearing which shuttles the line guide back and forth across the reel which results in a material lessening of the distance to which the angler may cast the bait. This resistance also invites backlash or entanglement of the line on the reel with the result that the line is severely strained if not broken. Another undesirable feature about the level winding reel is that it is geared to accommodate but one diameter of line, any line larger than the specified size being piled on the reel and any line smaller being wound with spaced turns which results in a winding which is not thoroughly compacted and therefore is liable to cause the backlash spoken of above.

I have provided a winding guide which may be manually operated by the angler to evenly distribute the wraps of the line regardless of the diameter of the latter thus providing a winding which is solidly compacted on the reel and which is therefore not likely to cause the annoying entanglements or breakage of the line when the angler is casting. The guide, in being independent of any drive gearing connected with the reel, is capable of offering a minimum of resistance to movement of the line thereby resulting in the obtaining of maximum distance in each cast.

In detail, I provide a strap 4 of spring metal, bent to cylindrical form, of a diameter sufficient to pass over the reel seat or the portion of a fishing rod adjacent the reel. The opposite ends of the strap are bent radially outwardly to provide ears 8 and 9 and are provided, respectively, with apertures 11 and notches 12. Disposed for free movement in the apertures and notches is a pair of bolts 13 joined together by a bar 14 which is soldered, or otherwise suitably secured, to each of the bolt heads 16. A plate 17, having spaced apertures therein through which the bolts pass, is slidably mounted on the bolts and is positioned to contact the ear 9, and nuts 18 are provided for forcing the ears together so as to clamp the strap on the reel seat or other cylindrical section of the fishing rod upon which it is desired to mount the guide. The strap may be quickly detached from the member upon which it is mounted by loosening the nuts 18 and moving the plate 17 outwardly from its engaged position with the ear 9 whereupon the strap will expand to the position indicated by the dotted lines of Figure 3 and the rod or the reel seat thereof may be readily passed through the gap between the ends of the bolts 13 and the ear 9.

Attached to the strap 4, at a point on the outer periphery thereof midway between the ears 8 and 9, is a pair of brackets 19 each having an aperture therein which receives a pivot pin 21 provided at one end with a head 22 which engages one of the brackets and prevents axial movement of the pin in one direction. A lever 23 is provided, having at one end a hub 24 which is journaled on the pin 21, and at the other end an eye 26 through which the line 27 passes. A thumb grip is provided by means of which the lever 23 may be manually oscillated about its pivotal axis so as to guide the line 27 back and forth across the reel spool so as to wind the line evenly on the latter. This grip comprises a piece of sheet metal doubled upon itself, provided at the bend 28 with a downwardly projecting ear 29 which is apertured and journaled on the pin 21, on its upper edge with a pair of oppositely directed wings 31 to provide a saddle in which the thumb of the user may rest and at one end with a pair of spaced extensions 32 which provide a fork straddling the lever 23. The lower edges of these extensions bear against shoulders formed at the junction of the lever with the hub 24 and the upper edges thereof bear against a pin 33 which is fixed in the lever and projects from each side thereof. This construction provides a slide for the extensions 32 in which they may be moved axially of the pivot pin 21. A coil spring 34 is provided on the pin 21 the ends thereof bearing against the ear 29 and the bracket 19, and a nut 36, engaging the threads 37 provided at the extreme end of the pivot pin, is provided for governing the compression of the spring so as to increase or decrease the frictional engagement of the lever hub 24 with the bracket 19. This frictional adjustment of the lever is quite important, for the reason that if the movement of the lever were unrestrained when the angler is casting, at a time when his thumb is not in engagement with the wings 31, the outgoing line might be deflected as it leaves the reel thereby possibly resulting in backlash and entanglement of the line in the reel.

It will be seen from the above description of my invention, that I have provided simple and efficient means for guiding a cord on to a reel or other mandrel upon which it is to be wound, that I have provided a device of the character described which may be readily and quickly attached to or detached from the fishing rod, that the provision of adjustable spring tension in the guide lever mounting permits the lever to be maintained in any desired position and guards against backlash in the line when the angler is casting, and that the device may be produced to sell at a very reasonable cost.

I claim:

1. A winding guide comprising a strap for encircling a body, means for contracting said strap about said body to grip the latter, a pair of brackets on said strap, a pivot pin carried by said brackets, a lever pivotally mounted at one end thereof on said pivot pin and provided at the other end thereof with an eye through which a cord may pass, and a grip engageable by a finger of the user mounted on said pivot pin and having extended portions thereof engaging said lever.

2. A winding guide comprising a strap for encircling a body, means for contracting said strap about said body to grip the latter, a pair of brackets on said strap, a pivot pin carried by said brackets, a lever pivotally mounted at one end thereof on said pivot pin and provided at the other end thereof with an eye through which a cord may pass, a grip engageable by a finger of the user mounted on said pivot pin and having extended portions thereof engaging said lever, and a coil spring surrounding said pivot pin and engaging, at the respective ends thereof, said grip and one of said brackets.

3. A winding guide comprising a member, for engaging a body, a pair of brackets secured to said member, each of said brackets having an aperture therein, a pivot pin disposed in said bracket apertures, a lever journaled at one end on said pivot pin and at the other end having an aperture through which a cord may pass, means engageable by a finger of the user for moving said lever about the pivot pin provided with a pair of spaced extensions slidably engaging a portion of said lever, a pair of oppositely directed extensions curved to provide a saddle for the reception of the user's finger and an apertured extension engaging said pivot pin, a coil spring on said pivot pin and interposed between said apertured extension and one of said brackets, and a nut threadedly engaged with said pivot pin and contacting said apertured extension for moving the latter axially of the pivot pin to compress said spring.

MAX H. REITINGER.